(12) United States Patent
Cho et al.

(10) Patent No.: US 9,822,853 B2
(45) Date of Patent: Nov. 21, 2017

(54) PLANETARY GEAR TRAIN OF AUTOMATIC TRANSMISSION FOR VEHICLE

(71) Applicant: Hyundai Motor Company, Seoul (KR)

(72) Inventors: Wonmin Cho, Hwaseong-si (KR); Jae Chang Kook, Hwaseong-si (KR); Hyun Sik Kwon, Seoul (KR); Seongwook Ji, Ansan-si (KR); Wookjin Jang, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/188,793

(22) Filed: Jun. 21, 2016

(65) Prior Publication Data

US 2017/0108091 A1    Apr. 20, 2017

(30) Foreign Application Priority Data

Oct. 15, 2015    (KR) .................. 10-2015-0144302

(51) Int. Cl.
*F16H 3/66*    (2006.01)

(52) U.S. Cl.
CPC ....... *F16H 3/66* (2013.01); *F16H 2200/0065* (2013.01); *F16H 2200/2012* (2013.01);
(Continued)

(58) Field of Classification Search
CPC .............. F16H 3/66; F16H 2200/2046; F16H 2200/2012; F16H 2200/0065; F16H 2200/2097
(Continued)

(56) References Cited

U.S. PATENT DOCUMENTS 7,575,533 B2    8/2009  Gumpoltsberger
2005/0090355 A1*  4/2005  Ota ................ F16H 61/0213
                                          475/123
(Continued)

FOREIGN PATENT DOCUMENTS

EP    1435477 A2 *  7/2004  .......... F16H 3/666
JP    4380573 B2    12/2009
(Continued)

*Primary Examiner* — Roger L Pang
(74) *Attorney, Agent, or Firm* — Morgan, Lewis & Bockius LLP

(57) ABSTRACT

A planetary gear train of claim of an automatic transmission for a vehicle may include an input shaft, an output shaft, a first planetary gear set, a second planetary gear set, a third planetary gear set, a fourth planetary gear set, six control elements for selectively interconnecting rotation elements of the planetary gear sets and a transmission housing, a first connecting member directly connected to the transmission housing, a second connecting member selectively connected to the transmission housing, a third connecting member, a fourth connecting member selectively connected to the input shaft, a fifth connecting member directly connected to the input shaft, and selectively connected to the third connecting member, a sixth connecting member selectively connected to the transmission housing, a seventh connecting selectively connected the fifth connecting member, and selectively connected to the transmission housing, and an eighth connecting member directly connected to the output shaft.

4 Claims, 2 Drawing Sheets

(52) U.S. Cl.
CPC ............... *F16H 2200/2046* (2013.01); *F16H 2200/2097* (2013.01)

(58) Field of Classification Search
USPC ........................................ 475/275–291, 330
See application file for complete search history.

(56) References Cited

U.S. PATENT DOCUMENTS

| | | | |
|---|---|---|---|
| 2007/0207891 A1* | 9/2007 | Gumpoltsberger | ....... F16H 3/66 475/280 |
| 2009/0298639 A1* | 12/2009 | Kim | ....... F16H 3/663 475/275 |
| 2013/0085032 A1* | 4/2013 | Mellet | ....... F16H 3/66 475/275 |
| 2014/0364269 A1* | 12/2014 | Kaltenbach | ....... F16H 3/006 475/282 |

FOREIGN PATENT DOCUMENTS

| | | |
|---|---|---|
| JP | 2014-500462 A | 1/2014 |
| KR | 10-2013-0013251 A | 2/2013 |

* cited by examiner

FIG. 2

| shift-stage | C1 | C2 | C3 | B1 | B2 | B3 | gear ratio |
|---|---|---|---|---|---|---|---|
| D1 |  | ● |  | ● |  |  | 4.300 |
| D2 |  | ● |  |  |  | ● | 2.540 |
| D3 |  | ● | ● |  |  |  | 1.721 |
| D4 | ● | ● |  |  |  |  | 1.329 |
| D5 | ● |  | ● |  |  |  | 1.000 |
| D6 | ● |  |  |  |  | ● | 0.787 |
| D7 | ● |  |  |  | ● |  | 0.690 |
| D8 |  |  |  |  | ● | ● | 0.635 |
| D9 |  |  | ● |  | ● |  | 0.568 |
| REV |  |  | ● | ● |  |  | 3.700 |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2015-0144302, filed Oct. 15, 2015, the entire contents of which is incorporated herein for all purposes by this reference.

BACKGROUND OF THE INVENTION

Field of the Invention

The present invention relates to an automatic transmission for a vehicle.

Description of Related Art

Recent increases in oil prices are triggering hard competition among auto-makers in enhancing fuel consumption of a vehicle.

In this sense, research is being conducted on engines in terms of reducing weight and improving fuel efficiency by down-sizing, and research is also being conducted to ensure both drivability and competitiveness for maximizing fuel efficiency by implementing an automatic transmission with multiple speed stages.

However, in the case of the automatic transmission, the number of internal components increases as the number of gear shift stages is increased, which may deteriorate installability, production cost, weight and/or power flow efficiency.

Therefore, in order to maximally enhance fuel consumption of an automatic transmission having more shift stages, it is important for improved efficiency to be derived by a smaller number of parts.

In this respect, an eight-speed automatic transmission has been recently introduced, and a planetary gear train for an automatic transmission enabling more shift stages is under investigation.

The above information disclosed in this Background section is only for enhancement of understanding of the background of the invention and therefore it may contain information that does not form the prior art that is already known in this country to a person of ordinary skill in the art.

BRIEF SUMMARY

Various aspects of the present invention are directed to providing a planetary gear train of an automatic transmission for a vehicle having advantages of, by minimal complexity, realizing at least nine forward speeds and at least one reverse speed, thereby improving power delivery performance and fuel consumption due to multi-stages, and improving driving stability of a vehicle by utilizing a low rotation speed of an engine.

According to various aspects of the present invention, a planetary gear train of claim of an automatic transmission for a vehicle may include an input shaft for receiving an engine torque, an output shaft for outputting a shifted torque, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, six control elements for selectively interconnecting the rotation elements and a transmission housing, a first connecting member connected to the first rotation element and directly connected to the transmission housing, a second connecting member connected to the second rotation element and the twelfth rotation element and selectively connected to the transmission housing, a third connecting member connected to the third rotation element and the eighth rotation element, a fourth connecting member connected to the fourth rotation element and the tenth rotation element and selectively connected to the input shaft, a fifth connecting member connected to the fifth rotation element, directly connected to the input shaft, and selectively connected to the third connecting member, a sixth connecting member connected to the sixth rotation element and selectively connected to the transmission housing, a seventh connecting member connected to the seventh rotation element, selectively connected the fifth connecting member, and selectively connected to the transmission housing, and an eighth connecting member connected to the ninth rotation element and the eleventh rotation element and directly connected to the output shaft.

The first planetary gear set may be a single pinion planetary gear set including a first sun gear, a first planet carrier, and a first ring gear, where the first rotation element may be the first sun gear, the second rotation element may be the first planet carrier, and the third rotation element may be the first ring gear, the second planetary gear set may be a single pinion planetary gear set including a second sun gear, a second planet carrier, and a second ring gear, where the fourth rotation element may be the second sun gear, the fifth rotation element may be the second planet carrier, and the sixth rotation element may be the second ring gear, the third planetary gear set may be a single pinion planetary gear set including a third sun gear, a third planet carrier, and a third ring gear, where the seventh rotation element may be the third sun gear, the eighth rotation element may be the third planet carrier, the ninth rotation element may be the third ring gear, and the fourth planetary gear set may be a single pinion planetary gear set including a fourth sun gear, a fourth planet carrier, and a fourth ring gear, where the tenth rotation element may be the fourth sun gear, the eleventh rotation element may be the fourth planet carrier, and the twelfth rotation element may be the fourth ring gear.

The six control elements may include a first clutch selectively connecting the third connecting member and the fifth connecting member, a second clutch selectively connecting the input shaft and the fourth connecting member, a third clutch selectively connecting the fifth connecting member and the seventh connecting member, a first brake selectively connecting the second connecting member and the transmission housing, a second brake selectively connecting the sixth connecting member and the transmission housing, and a third brake selectively connecting the seventh connecting member and the transmission housing.

Shift stages realized by selective operation of the six control elements include a forward first speed formed by operation of the second clutch and the first brake, a forward second speed formed by operation of the second clutch and the third brake, a forward third speed formed by operation of the second and third clutches, a forward fourth speed formed by operation of the first and second clutches, a forward fifth speed formed by operation of the first and third clutches, a forward sixth speed formed by operation of the first clutch and the third brake, a forward seventh speed formed by operation of the first clutch and the second brake, a forward eighth speed formed by operation of the second and the third brake, a forward ninth speed formed by operation of the third clutch and the second brake, and a reverse speed formed by operation of the third clutch and the first brake.

According to various aspects of the present invention, a planetary gear train of claim of an automatic transmission for a vehicle may include an input shaft for receiving an engine torque, an output shaft for outputting a shifted torque, a first planetary gear set as a single pinion planetary gear set including first, second, and third rotation elements, a second planetary gear set as a single pinion planetary gear set including fourth, fifth, and sixth rotation elements, a third planetary gear set as a single pinion planetary gear set including seventh, eighth, and ninth rotation elements, a fourth planetary gear set as a single pinion planetary gear set including tenth, eleventh, and twelfth rotation elements, a first connecting member connected to the first rotation element and directly connected to the transmission housing, a second connecting member connected to the second rotation element and the twelfth rotation element and selectively connected to the transmission housing, a third connecting member connected to the third rotation element and the eighth rotation element, a fourth connecting member connected to the fourth rotation element and the tenth rotation element and selectively connected to the input shaft, a fifth connecting member connected to the fifth rotation element, directly connected to the input shaft, and selectively connected to the third connecting member, a sixth connecting member connected to the sixth rotation element and selectively connected to the transmission housing, a seventh connecting member connected to the seventh rotation element, selectively connected the fifth connecting member, and selectively connected to the transmission housing, an eighth connecting member connected to the ninth rotation element and the eleventh rotation element and directly connected to the output shaft, a first clutch selectively connecting the third connecting member and the fifth connecting member, a second clutch selectively connecting the input shaft and the fourth connecting member, a third clutch selectively connecting the fifth connecting member and the seventh connecting member, a first brake selectively connecting the second connecting member and the transmission housing, a second brake selectively connecting the sixth connecting member and the transmission housing, and a third brake selectively connecting the seventh connecting member and the transmission housing.

The first planetary gear set may include a first sun gear, a first planet carrier, and a first ring gear, where the first rotation element may be the first sun gear, the second rotation element may be the first planet carrier, the first ring gear, the second planetary gear set may include a second sun gear, a second planet carrier, and a second ring gear, where the fourth rotation element may be the second sun gear, the fifth rotation element may be the second planet carrier, and the sixth rotation element may be the second ring gear, the third planetary gear set may include a third sun gear, a third planet carrier, and a third ring gear, where the seventh rotation element may be the third sun gear, the eighth rotation element may be the third planet carrier, and the ninth rotation element may be the third ring gear, and the fourth planetary gear set may include a fourth sun gear, a fourth planet carrier, and a fourth ring gear, where the tenth rotation element may be the fourth sun gear, the eleventh rotation element may be the fourth planet carrier, and the twelfth rotation element may be the fourth ring gear.

According to various aspects of the present invention, a planetary gear train of claim of an automatic transmission for a vehicle may include an input shaft for receiving an engine torque, an output shaft for outputting a shifted torque, a first planetary gear set as a single pinion planetary gear set including a first sun gear, a first planet carrier, and a first ring gear, a second planetary gear set as a single pinion planetary gear set including a second sun gear, a second planet carrier, and a second ring gear, a third planetary gear set as a single pinion planetary gear set including a third sun gear, a third planet carrier, and a third ring gear, a fourth planetary gear set as a single pinion planetary gear set including a fourth sun gear, a fourth planet carrier, and a fourth ring gear, a first connecting member connected to the first sun gear and directly connected to the transmission housing, a second connecting member connected to the first planet carrier and the fourth ring gear and selectively connected to the transmission housing, a third connecting member connected to the first ring gear and the third planet carrier, a fourth connecting member connected to the second sun gear and the fourth sun gear and selectively connected to the input shaft, a fifth connecting member connected to the second planet carrier, directly connected to the input shaft, and selectively connected to the third connecting member, a sixth connecting member connected to the second ring gear and selectively connected to the transmission housing, a seventh connecting member connected to the third sun gear, selectively connected to the fifth connecting member, and selectively connected to the transmission housing, an eighth connecting member connected to the third ring gear and the fourth planet carrier and directly connected to the output shaft, and six control elements for selectively interconnecting the connecting members and the transmission housing.

A planetary gear train according to various embodiments of the present invention realizes at least nine forward speeds and at least one reverse speed achieved by operating the four planetary gear sets as simple planetary gear sets by controlling six control elements.

In addition, a planetary gear train according to various embodiments of the present invention substantially improves driving stability by realizing shift stages appropriate for rotation speed of an engine due to multiple speed stages of an automatic transmission.

In addition, a planetary gear train according to various embodiments of the present invention maximizes engine driving efficiency by the multiple speed stages of an automatic transmission, and improves power delivery performance and fuel consumption.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart for respective control elements at respective shift stages in the exemplary planetary gear train according to the present invention.

Figure 1:
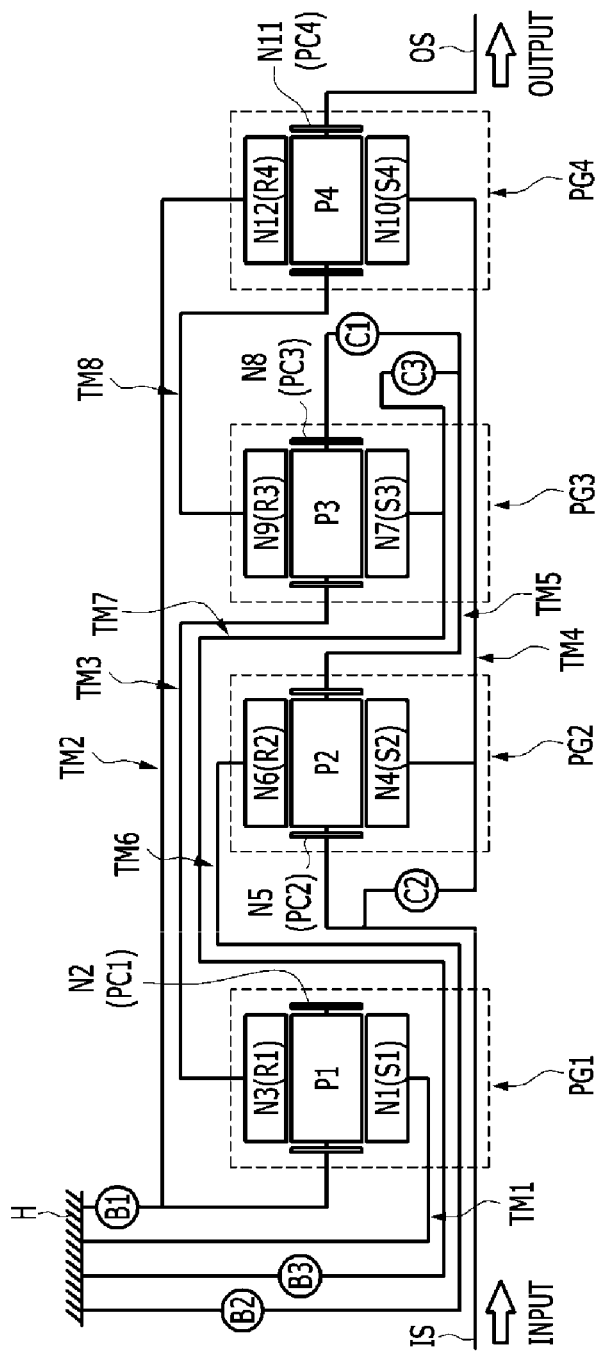
FIG. 1 is a schematic diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram of a planetary gear train according to various embodiment of the present invention. Referring to FIG. 1, a planetary gear train according to various embodiments of the present invention includes first, second, third, and fourth planetary gear sets PG1, PG2, PG3, and PG4 arranged on a same axis, an input shaft IS, an output shaft OS, eight connecting members TM1 to TM8 for interconnecting rotation elements of the first, second, third, and fourth planetary gear sets PG1, PG2, PG3, and PG4, six control elements C1 to C3 and B1 to B3, and a transmission housing H.

Torque input from the input shaft IS is shifted by cooperative operation of the first, second, third, and fourth planetary gear sets PG1, PG2, PG3, and PG4, and then output through the output shaft OS.

The simple planetary gear sets PG1, PG2, PG3, and PG4 are arranged in the order of first, second, third, and fourth planetary gear sets PG1, PG2, PG3, and PG4, from an engine side.

The input shaft IS is an input member and the torque from a crankshaft of an engine, after being torque-converted through a torque converter, is input into the input shaft IS.

The output shaft OS is an output member, and being arranged on a same axis with the input shaft IS, delivers a shifted torque to a drive shaft through a differential apparatus.

The first planetary gear set PG1 is a single pinion planetary gear set, and includes a first sun gear S1, a first planet carrier PC1 that supports a first pinion P1 externally engaged with the first sun gear S1, and a first ring gear R1 internally engaged with the first pinions P1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and includes a second sun gear S2, a second planet carrier PC2 that supports a second pinion P2 externally engaged with the second sun gear S2, and a second ring gear R2 internally engaged with the second pinions P2. The second sun gear S2 acts as a fourth rotation element N4, the second planet carrier PC2 acts as a fifth rotation element N5, and the second ring gear R2 acts as a sixth rotation element N6.

The third planetary gear set PG3 is a single pinion planetary gear set, and includes a third sun gear S3, a third planet carrier PC3 that supports a third pinion P3 externally engaged with the third sun gear S3, and a third ring gear R3 internally engaged with the third pinions P3. The third sun gear S3 acts as a seventh rotation element N7, the third planet carrier PC3 acts as an eighth rotation element N8, and the third ring gear R3 acts as a ninth rotation element N9.

The fourth planetary gear set PG4 is a single pinion planetary gear set, and includes a fourth sun gear S4, a fourth planet carrier PC4 that supports a fourth pinion P4 externally engaged with the fourth sun gear S4, and a fourth ring gear R4 internally engaged with the fourth pinions P4. The fourth sun gear S4 acts as a tenth rotation element N10, the fourth planet carrier PC4 acts as an eleventh rotation element N11, and the fourth ring gear R4 acts as a twelfth rotation element N12.

In the arrangement of the first, second, third, and fourth planetary gear sets PG1, PG2, PG3, and PG4, the second rotation element N2 is directly connected with the twelfth rotation element N12, the third rotation element N3 is directly connected with the eighth rotation element N8, the fourth rotation element N4 is directly connected with the tenth rotation element N10, the ninth rotation element N9 is directly connected with the eleventh rotation element N11, by eight connecting members TM1 to TM8.

The eight connecting members TM1 to TM8 are arranged as follows.

The first connecting member TM1 is connected with the first rotation element N1 (first sun gear S1), and directly connected with the transmission housing H, thereby always acting as a fixed element.

The second connecting member TM2 is connected with the second rotation element N2 (first planet carrier PC1) and the twelfth rotation element N12 (fourth ring gear R4), and selectively connected with the transmission housing H.

The third connecting member TM3 is connected with the third rotation element N3 (first ring gear R1) and the eighth rotation element N8 (third planet carrier PC3).

The fourth connecting member TM4 is connected with the fourth rotation element N4 (second sun gear N2) and the tenth rotation element N10 (fourth sun gear S4), and selectively connected with the input shaft IS.

The fifth connecting member TM5 is connected with the fifth rotation element N5 (second planet carrier PC2), and directly connected with the input shaft IS thereby always acting as an input element, while being selectively connected with the third connecting member TM3.

The sixth connecting member TM6 is connected with the sixth rotation element N6 (second ring gear R2), and selectively connected with the transmission housing H.

The seventh connecting member TM7 is connected with the seventh rotation element N7 (third sun gear S3), selectively connected with the fifth connecting member TM5, and selectively connected with the transmission housing H.

The eighth connecting member TM8 is connected with the ninth rotation element N9 (third ring gear R3) and the eleventh rotation element N11 (fourth planet carrier PC4), and directly connected with the output shaft OS, thereby always acting as an output element.

The connecting members TM1 to TM8 may be selectively interconnected with one another by control elements of three clutch C1, C2, and C3.

The connecting members TM1 to TM9 may be selectively connected with the transmission housing H, by control elements of three brakes B1, B2, and B3.

The six control elements C1 to C3 and B1 to B3 are arranged as follows.

The first clutch C1 is arranged between the third connecting member TM3 and the fifth connecting member TM5, such that the third connecting member TM3 and the fifth connecting member TM5 may selectively become integral.

The second clutch C2 is arranged between the input shaft IS (or fifth connecting member TM5) and the fourth connecting member TM4, such that the input shaft IS (or fifth connecting member TM5) and the fourth connecting member TM4 may selectively become integral.

The third clutch C3 is arranged between the fifth connecting member TM5 and the seventh connecting member TM7, such that the fifth connecting member TM5 and the seventh connecting member TM7 may selectively become integral.

The first brake B1 is arranged between the second connecting member TM2 and the transmission housing H, such that the second connecting member TM2 may selectively act as a fixed element.

The second brake B2 is arranged between the sixth connecting member TM6 and the transmission housing H, such that the sixth connecting member TM6 may selectively act as a fixed element.

The third brake B3 is arranged between the seventh connecting member TM7 and the transmission housing H, such that the seventh connecting member TM7 may selectively act as a fixed element.

The control elements of the first, second, and third clutches C1, C2, and C3 and the first, second, and third brakes B1, B2, and B3 may be realized as multi-plate hydraulic pressure friction devices that are frictionally engaged by hydraulic pressure.

FIG. 2 is an operational chart for respective control elements at respective shift stages in a planetary gear train according to various embodiments of the present invention. As shown in FIG. 2, a planetary gear train according to various embodiments of the present invention performs shifting by operating two control elements at respective shift stages.

In the forward first speed D1, the second clutch C2 and the first brake B1 are simultaneously operated. As a result, the input shaft IS is interconnected with the fourth connecting member TM4 by the operation of the second clutch C2, and torque is simultaneously input to the fourth and fifth connecting members TM4 and TM5. In addition, while first connecting member TM1 is acting as a fixed element, the second connecting member TM2 simultaneously acts as a fixed element by the operation of first brake B1, thereby realizing the forward first speed and outputting a shifted torque through the output shaft OS connected with the eighth connecting member TM8.

In the forward second speed D2, the second clutch C2 and the third brake B3 are simultaneously operated. As a result, the input shaft IS is interconnected with the fourth connecting member TM4 by the operation of the second clutch C2, and torque is simultaneously input to the fourth and fifth connecting members TM4 and TM5. In addition, while the first connecting member TM1 is acting as a fixed element, the seventh connecting member TM7 simultaneously acts as a fixed element by the operation of third brake B3, thereby realizing the forward second speed and outputting a shifted torque through the output shaft OS connected with the eighth connecting member TM8.

In the forward third speed D3, the second and third clutches C2 and C3 are simultaneously operated. As a result, the input shaft IS is interconnected with the fourth connecting member TM6 by the operation of the second clutch C2, and the fifth connecting member TM5 is interconnected with the seventh connecting member TM7 by the operation of the third clutch C3. In this state, torque is input to the fourth and fifth connecting members TM4 and TM5. In addition, the first connecting member TM1 acts as a fixed element, thereby realizing the forward third speed and outputting a shifted torque through the output shaft OS connected with the eighth connecting member TM8.

In the forward fourth speed D4, first and second clutches C1 and C2 are simultaneously operated. As a result, the third connecting member TM3 is interconnected with the fifth connecting member TM5 by the operation of the first clutch C1, and the input shaft IS is interconnected with the fourth connecting member TM6 by the operation of the second clutch C2. In this state, torque is input to the fourth and fifth connecting members TM4 and TM5. In addition, the first connecting member TM1 acts as a fixed element, thereby realizing the forward fourth speed and outputting a shifted torque through the output shaft OS connected with the eighth connecting member TM8.

In the forward fifth speed D5, the first and third clutches C1 and C3 are simultaneously operated. As a result, the third connecting member TM3 is interconnected with the fifth connecting member TM5 by the operation of the first clutch C1, and the fifth connecting member T5 is interconnected with the seventh connecting member TM7 by the operation of the third clutch C3. In this state, torque is input to the fifth connecting member TM5. In addition, the first connecting member TM1 acts as a fixed element, thereby realizing the forward fifth speed and outputting a shifted torque through the output shaft OS connected with the eighth connecting member TM8.

In the forward sixth speed D6, the first clutch C1 and the third brake B3 are simultaneously operated. As a result, the third connecting member TM3 is interconnected with the fifth connecting member TM5 by the operation of the first clutch C1, and torque is input to the fifth connecting member TM5. In addition, while the first connecting member TM1 is acting as a fixed element, seventh connecting member TM7 simultaneously acts as a fixed element by the operation of third brake B3, thereby realizing the forward sixth speed and outputting a shifted torque through the output shaft OS connected with the eighth connecting member TM8.

In the forward seventh speed D7, the first clutch C1 and the second brake B2 are simultaneously operated. As a result, the third connecting member TM3 is interconnected with the fifth connecting member TM5 by the operation of the first clutch C1, and torque is input to the fifth connecting member TM5. In addition, while the first connecting member TM1 is acting as a fixed element, sixth connecting member TM6 simultaneously acts as a fixed element by the operation of second brake B2, thereby realizing the forward seventh speed and outputting a shifted torque through the output shaft OS connected with the eighth connecting member TM8.

In the forward eighth speed D8, the second and third brakes B2 and B3 are simultaneously operated. As a result, while torque is input to the fifth connecting member TM5 and the first connecting member TM1 is acting as a fixed element, the sixth and seventh connecting members TM6 and TM7 simultaneously act as a fixed elements, thereby realizing the forward eighth speed and outputting a shifted torque through the output shaft OS connected with the eighth connecting member TM8.

In the forward ninth speed D9, the third clutch C3 and the second brake B2 are simultaneously operated. As a result, the fifth connecting member TM5 is interconnected with the seventh connecting member TM7 by the operation of the third clutch C3, and torque is input to the fifth connecting member TM5. In addition, while the first connecting member TM1 is acting as a fixed element, sixth connecting member TM6 simultaneously acts as a fixed element by the operation of second brake B2, thereby realizing the forward ninth speed and outputting a shifted torque through the output shaft OS connected with the eighth connecting member TM8.

In the reverse speed REV, the third clutch C3 and the first brake B1 are simultaneously operated. As a result, the fifth connecting member TM5 is interconnected with the seventh connecting member TM7 by the operation of the third clutch C3, and torque is input to the fifth connecting member TM5. In addition, while the first connecting member TM1 is acting as a fixed element, second connecting member TM2 simultaneously acts as a fixed element by the operation of first brake B1, thereby realizing the reverse speed and outputting a shifted torque through the output shaft OS connected with the eighth connecting member TM8.

As described above, a planetary gear train according to various embodiments of the present invention realizes at least nine forward speeds and at least one reverse speed formed by operating the four planetary gear sets PG1, PG2, PG3, and PG4 by controlling the three clutches C1, C2, and C3 and the three brakes B1, B2, and B3.

In addition, a planetary gear train according to various embodiments of the present invention substantially improves driving stability by realizing shift stages appropriate for rotation speed of an engine due to multi-stages of an automatic transmission.

In addition, a planetary gear train according to various embodiments of the present invention may maximize engine driving efficiency by multi-stages of an automatic transmission, and may improve power delivery performance and fuel consumption.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of claim of an automatic transmission for a vehicle, comprising:
    an input shaft configured for receiving an engine torque;
    an output shaft configured for outputting a shifted torque;
    a first planetary gear set including a first rotation element, a second rotation element, and a third rotation element;
    a second planetary gear set including a fourth rotation element, a fifth rotation element, and a sixth rotation element;
    a third planetary gear set including a seventh rotation element, an eighth rotation element, and a ninth rotation element;
    a fourth planetary gear set including a tenth rotation element, an eleventh rotation element, and a twelfth rotation element;
    six control elements for selectively interconnecting the rotation elements to each other or a transmission housing;
    a first connecting member fixedly connected to the first rotation element and directly connected to the transmission housing;
    a second connecting member fixedly connected to the second rotation element and the twelfth rotation element, such that the second and twelfth rotation elements always rotate at a same speed and selectively connected to the transmission housing;
    a third connecting member fixedly connected to the third rotation element and the eighth rotation element, such that the third and eighth rotation elements always rotate at a same speed;
    a fourth connecting member fixedly connected to the fourth rotation element and the tenth rotation element such that the fourth and tenth rotation elements always rotate at a same speed and selectively connected to the input shaft;
    a fifth connecting member fixedly connected to the fifth rotation element, fixedly connected to the input shaft, such that the fifth rotation element always rotate at a speed of the input shaft and selectively connected to the third connecting member;
    a sixth connecting member fixedly connected to the sixth rotation element and selectively connected to the transmission housing;
    a seventh connecting member fixedly connected to the seventh rotation element, selectively connected the fifth connecting member, and selectively connected to the transmission housing; and
    an eighth connecting member fixedly connected to the ninth rotation element and the eleventh rotation element and fixedly connected to the output shaft, such that the ninth and eleventh rotation elements always rotate at a speed of the output shaft.

2. The planetary gear train of claim 1, wherein
the first planetary gear set is a single pinion planetary gear set including a first sun gear, a first planet carrier, and a first ring gear, where the first rotation element is the first sun gear, the second rotation element is the first planet carrier, and the third rotation element is the first ring gear;
the second planetary gear set is a single pinion planetary gear set including a second sun gear, a second planet carrier, and a second ring gear, where the fourth rotation element is the second sun gear, the fifth rotation element is the second planet carrier, and the sixth rotation element is the second ring gear;
the third planetary gear set is a single pinion planetary gear set including a third sun gear, a third planet carrier, and a third ring gear, where the seventh rotation element is the third sun gear, the eighth rotation element is the third planet carrier, the ninth rotation element is the third ring gear; and
the fourth planetary gear set is a single pinion planetary gear set including a fourth sun gear, a fourth planet carrier, and a fourth ring gear, where the tenth rotation element is the fourth sun gear, the eleventh rotation element is the fourth planet carrier, and the twelfth rotation element is the fourth ring gear.

3. The planetary gear train of claim 1, wherein the six control elements comprise:
   a first clutch selectively connecting the third connecting member and the fifth connecting member;
   a second clutch selectively connecting the input shaft and the fourth connecting member;
   a third clutch selectively connecting the fifth connecting member and the seventh connecting member;
   a first brake selectively connecting the second connecting member and the transmission housing;
   a second brake selectively connecting the sixth connecting member and the transmission housing; and
   a third brake selectively connecting the seventh connecting member and the transmission housing.

4. The planetary gear train of claim 3, wherein shift stages realized by selective operation of the six control elements comprise:
   a forward first speed formed by operation of the second clutch and the first brake;
   a forward second speed formed by operation of the second clutch and the third brake;
   a forward third speed formed by operation of the second and third clutches;
   a forward fourth speed formed by operation of the first and second clutches;
   a forward fifth speed formed by operation of the first and third clutches;
   a forward sixth speed formed by operation of the first clutch and the third brake;
   a forward seventh speed formed by operation of the first clutch and the second brake;
   a forward eighth speed formed by operation of the second and the third brake;
   a forward ninth speed formed by operation of the third clutch and the second brake; and
   a reverse speed formed by operation of the third clutch and the first brake.

* * * * *